United States Patent
Zimmermann et al.

(10) Patent No.: US 6,718,257 B2
(45) Date of Patent: Apr. 6, 2004

(54) METHOD AND DEVICE FOR CONTROLLING OPERATING SEQUENCES

(75) Inventors: Christian Zimmermann, Tuebingen (DE); Manfred Kirschner, Stuttgart (DE); Beate Leibbrand, Muehlacker (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 287 days.

(21) Appl. No.: 09/909,698

(22) Filed: Jul. 20, 2001

(65) Prior Publication Data

US 2002/0038154 A1 Mar. 28, 2002

(30) Foreign Application Priority Data

Jul. 26, 2000 (DE) .......................... 100 36 643

(51) Int. Cl.$^7$ .............................................. G06F 13/00
(52) U.S. Cl. ............................ 701/115; 710/8; 701/29; 701/45
(58) Field of Search ................. 701/115, 102, 701/45, 29, 35; 710/8, 15, 20, 103, 107, 9; 711/170, 100

(56) References Cited

U.S. PATENT DOCUMENTS

| | | | |
|---|---|---|---|
| 4,360,870 A | | 11/1982 | McVey ........................ 710/9 |
| 4,982,714 A | * | 1/1991 | Takahashi et al. .......... 123/684 |
| 5,477,141 A | * | 12/1995 | Nather et al. ................. 701/35 |
| 5,954,804 A | | 9/1999 | Farmwald et al. .......... 710/107 |
| 6,067,302 A | * | 5/2000 | Tozuka ....................... 370/464 |
| 6,070,114 A | * | 5/2000 | Fendt et al. ................... 701/45 |

FOREIGN PATENT DOCUMENTS

| | | |
|---|---|---|
| DE | 196 09 883 | 10/1997 |
| DE | 197 52 031 | 5/1999 |
| EP | 0 733 976 | 9/1996 |
| GB | 2 264 576 | 9/1993 |
| JP | 10-97463 | 4/1998 |

OTHER PUBLICATIONS

K. J. Whiteley, *EPROM Decoder for Device Selection*, Electronic Engineering, Jun. 1986, vol. 58, No. 714, p. 36.
Klaus Dembowsky, *PC–gesteuerte Messtechnik* [PC–controlled measurement technology] Markt&Technik Buch –und Softwareverlag GmbH & Co., 1993, ISBN No. 3–87791–516–7.
Robert Brawner, "Expanding the I/O Facilities of the 8051 Microcomputer", Electronics, Nov. 1983, 162–163.
"Programmable Identification For I/O Devices", IBM Technical Disclosure Bulletin, Aug. 1979, 882–883.
"Method For Address Decode For Input/Output Devices", IBM Technical Disclosure Bulletin, Jan. 1989, 202–203.

* cited by examiner

*Primary Examiner*—Hieu T. Vo
(74) *Attorney, Agent, or Firm*—Kenyon & Kenyon

(57) ABSTRACT

A method and a device having a processor module for controlling operating sequences, in particular in an engine control unit in a motor vehicle, peripheral elements being selected by a processor module having a predetermined number of select interfaces by select signal output over these select interfaces, and instructions being transmitted to the peripheral elements over at least one information interface of the processor module. Selection identifiers are assigned to the instructions and transmitted together with them. Thus, a selection of peripheral elements is made by a select signal and a selection identifier.

9 Claims, 2 Drawing Sheets

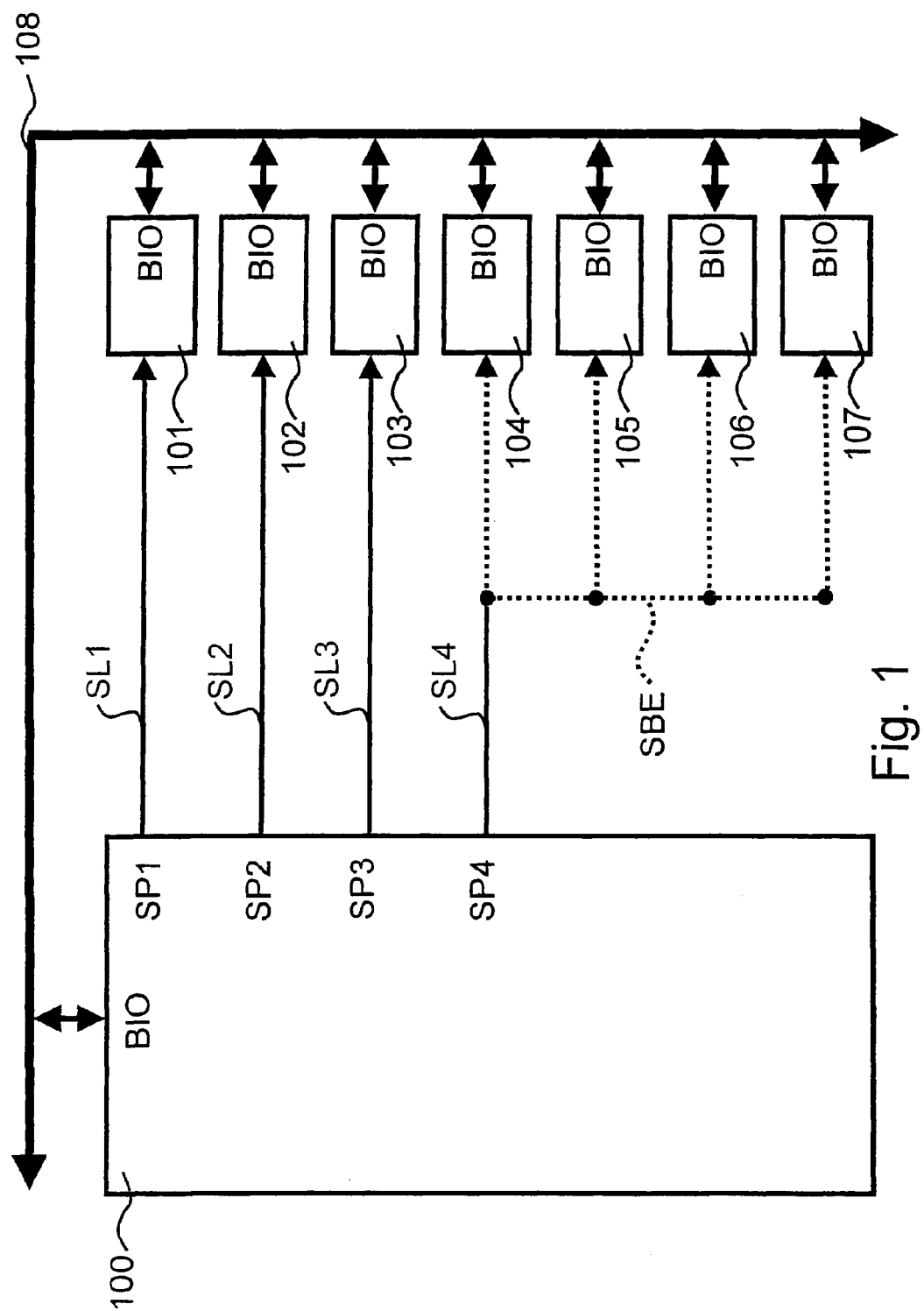

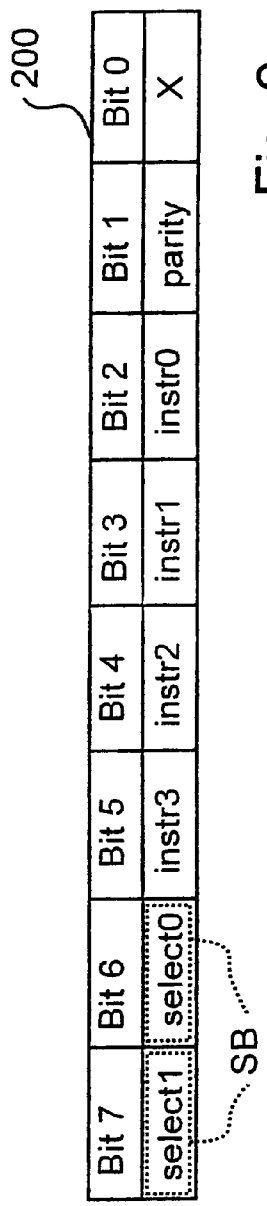
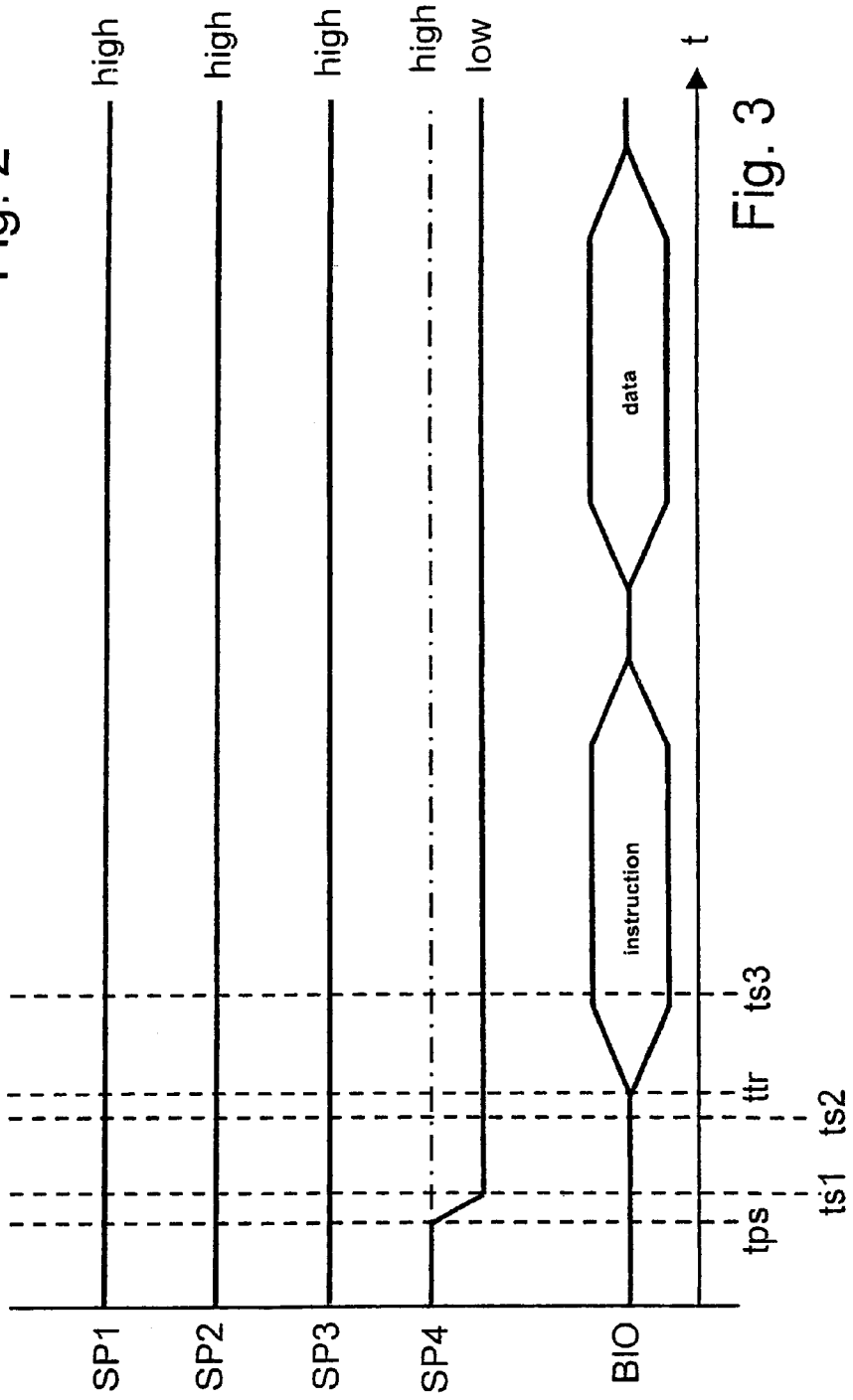

METHOD AND DEVICE FOR CONTROLLING OPERATING SEQUENCES

FIELD OF THE INVENTION

The present invention relates to a method and a device having a processor module for controlling operating sequences, in particular in an engine control unit in a motor vehicle, peripheral elements being selected or driven to control the operating sequences.

BACKGROUND INFORMATION

To select or address peripheral elements, in particular bus devices in a bus system, processor modules, controllers in particular, make a plurality of selection interfaces or select lines available so that one peripheral element or bus device can be addressed with each select line. A bus device is thus selected or addressed by activation of its respective select line. The number of possible bus devices or peripheral elements that can be addressed by the processor module is thus limited, the limit being determined by the number of select lines or select signals made available by the processor module.

To expand the number of bus devices, a code is generated from a number of select signals. This code must then be decoded again by additional hardware, usually a decoder module. The required decoder logic unit entails an increased complexity in terms of circuitry, leading to higher costs and greater space requirements for the circuitboard.

Use of such a decoder logic unit is described in the article "EPROM decoder for device selection" by K. J. Whiteley in the technical journal *Electronic Engineering*, volume 58, number 714, page 36, of June 1986. Usually a number of TTL modules will be hardwired as the decoder logic to represent the select function. This article describes selection or control of individual peripheral modules by an EPROM. If the number of select outputs or select interfaces of the EPROM is too low in comparison with the number of peripheral modules to be controlled, the selection options are expanded with the help of a decoder module, namely a 4:16 decoder here, which is connected in between. Thus, by using the decoder module, more than the maximum possible number of peripheral modules can be selected or driven via the EPROM.

The design of such address decoding using TTL modules is also described in the technical book *PC-gesteuerte Messtechnik* [PC-controlled measurement technology] by Klaus Dembowsky of 1993, published by Markt&Technik Buch- und Softwareverlag GmbH & Co. under ISBN No. 3-87791-516-7. The design of decoder circuits using logic modules, TTL modules, comparator modules or PAL (programmable array logic) modules is described on pages 58 through 65.

Here again, the required decoder logic means more complex circuitry, leading to higher costs and more space required for the circuitboard.

This complex circuitry is to be avoided according to the present invention.

SUMMARY OF THE INVENTION

The present invention is based on a method and a device having a processor module for controlling operating sequences, in particular in an engine control unit in a motor vehicle. Peripheral elements here are selected by a processor module having a predetermined number of select interfaces by select signals output over these select interfaces, the peripheral elements also transmitting instructions or commands and/or data over at least one information interface of the processor module.

Advantageously, selection identifiers are assigned to the instructions and transmitted together with them. The peripheral element or elements are thus selected by a select signal and the selection identifier. It is advantageous that this makes it possible to expand the number of peripheral elements that can be controlled or addressed, in particular bus devices, without requiring any additional hardware. Thus, for example, an SPI (serial peripheral interface) bus as well as other comparable bus systems can be expediently expanded without any increased cost or increased circuit complexity.

Thus, a plurality of peripheral elements can preferably be connected to one select interface of the processor module and nevertheless be selected or addressed individually, the peripheral elements connected to the same select interface preferably being different from one another.

The selection identifier and the instruction can be transmitted to advantage in digital form as an entity composed of individual binary signals (bits), the selection identifier replacing a portion of the bits of the instruction having a predetermined bit length so that the transmitted selection identifier and instruction as an entity have the same number of bits as the instruction alone previously.

As an advantageous refinement, if the same number of instructions or commands should also be available after allocation of the selection identifier, the number of bits in the entity of the selection identifier and instruction is increased by the number of bits in the selection identifier. For example, if the command or instruction is transmitted in a data frame, the data frame is thus enlarged or the bit content of the frame is increased.

It is thus possible in an advantageous manner to select or address a greater number of peripheral elements or bus devices than would correspond to the number of select interfaces of the processor module by expanding the bus instruction words or bus command words by one or more select bits, so the number of possible bus devices, i.e., peripheral elements, is increased without any additional hardware.

BRIEF DESCRIPTION OF THE DRAWINGS

FIG. 1 shows a schematic diagram of a processor module having a bus system and various peripheral elements connected to it.

FIG. 2 shows an instruction word or a command word (e.g., 8 bits) according to the present invention.

FIG. 3 shows a timing chart or a time sequence chart of the signals transmitted over the select interfaces or the information interface.

DETAILED DESCRIPTION

FIG. 1 shows a processor module 100 which is connected to a bus system, e.g., an SPI bus 108, over a bus IO (BIO), i.e., a bus input/output interface, and communicates over it. Processor module 100 also has select interfaces, called select ports SP1 through SP4, over which peripheral elements 101 to 107 are connected by select lines SL1 to SL4. In the related art, a maximum of four peripheral elements 101 through 104 can be selected or addressed by the processor module with a direct connection over four select lines SL1 through SL4 shown here or corresponding select interfaces SP1 through SP4. Then, in addition to peripheral elements 101 through 104, peripheral elements 105 through 107 can also be selected by the processor module, in particular selected individually due to the expansion with a selection identifier, referred to in short as SBE (select bit expansion), to be explained in greater detail below.

In addition, in the case of bus system 108, an SPI bus in particular is assumed as an example. Other bus systems of comparable possibilities and applications may also be used according to the present invention.

SPI communication usually takes place as follows. Controller or processor module 100 activates the select signal responsible for the SPI module to be addressed, i.e., the peripheral element, over corresponding select interface SP1 through SP4 and then sends a command or instruction and optionally data over SPI bus 108. The command or instruction which is sent (one byte in the example) is composed of command bits, i.e., individual binary signals. Additional information may also be present in the scope of the information sent, e.g., for correction of errors. In such a traditional command structure, six instruction bits or command bits instr0 through instr5 are then filed under bit 2 through bit 7 of the instruction sent plus one bit for error checking, e.g., stored under bit 1 (e.g., for an even parity check or a cyclic redundancy check) and possible additional information is stored under bit 0. Thus, as explained, a maximum of $2^6=64$ different instructions or commands can be transmitted per module in the case of six command bits instr0 through instr5.

FIG. 2 shows an information frame 200, in particular a command word or instruction word according to the present invention. Bit 0 here represents any desired additional information, e.g., for error correction, and bit 1 represents a parity bit, e.g., for an even parity check.

Likewise, bit 0 and bit 1 may also be used here for checking as part of a cyclic redundancy check CRC. From command bits or instruction bits instr0 through instr5 described previously, i.e., bit 2 through bit 7, two bits bit 6 and bit 7 here are replaced by select bits, i.e., select bits SB select0 and select1. Now $2^4=16$ different commands can be transmitted per module by four instruction bits instr0 through instr3, but many more peripheral elements or modules, namely four here instead of one, can be selected per select interface.

Thus, according to the present invention, the command or instruction is expanded by one or more bits for selection of modules select0, select1. As explained here, a portion of the instruction bits may be replaced, or information frame 200 is expanded by select bits SB, and in this case it is no longer 8 bits long, but instead it is 10 bits long or is expanded by another byte so that then a full 8 bits are available for selection of peripheral elements.

In both cases, the response then takes place by the select signal over select interfaces SP1 through SP4 and corresponding select bits SB in the instruction. It is thus now possible to attach multiple SPI modules to one select line. The final differentiation then takes place on the basis of the new select bits, in particular at the beginning of the instruction. This yields the command structure shown in FIG. 2 or as a refinement thereof, that having an enlarged information frame or instruction frame with two bytes, for example.

Due to the use of select bits SB in the information frame, in particular information frame 200, select bit expansion SBE which is illustrated in FIG. 1 can then be implemented, so that then instead of peripheral elements 101 through 104 having four select interfaces, now peripheral elements 101 through 107 can be selected and controlled. These peripheral elements include, for example, an output stage circuit, a stabilization circuit including a watchdog, a pure monitoring circuit (watchdog), other injection-specific output stage circuits, for example, or a serial EPROM. The SPI functionality of the peripheral elements represented here may be initialization, communication with the monitoring circuit, the watchdog in particular, output stage diagnosis, data input, writing and reading data.

FIG. 3 shows in a timing diagram over time t as an example of a signal curve at select interfaces SP1 through SP4 and respective select lines SL1 through SL4 as well as bus interface BIO. The select signal may assume two values "high" and "low" as shown at SP1 through SP4, for example. Select interfaces or select signals SP1 through SP3 are high in this example when select low operation is assumed as the basis. This means that in this example, switching the level on a line from high to low indicates selection of a peripheral element. Likewise, however, the reverse logic is also conceivable, i.e., select high operation. In this example, the select port, i.e., select interface SP4 is switched from high to low at time tps. The peripheral element would thus be selected over select port SP4 at time ts1 in the case of an arrangement in which one peripheral element is provided per select port, as in the related art.

In the example having additional hardware, in particular a decoder module, as described in the related art, the selection would be made at time ts2 by four select ports SP1 through SP4, e.g., SP1 high, SP2 high, SP3 high, SP4 low (h h h 1) after a certain processing time ts2–ts1.

Transmission of instructions and/or data over bus IO BIO and thus over bus system 108 is begun at time t transmit ttr. Thus, the selection according to the present invention is made after analysis of two select bits SB as part of the instruction at time ts3. Following the instruction or instructions, data can then be transmitted as represented in FIG. 3.

Instead of addressing a peripheral element directly, i.e., an SPI module here over a directly assigned select line or as part of an expansion by a decoder module and a signal code, the SPI command words or instruction words are thus expanded here by one or more select bits, so that several modules can be connected to one select line without any additional hardware or hardware measures in the controller, permitting great potential savings from the standpoint of costs and circuitboard area as well as circuit complexity

What is claimed is:

1. A device for controlling an operating sequence, comprising:
    a processor module including a predetermined number of select interfaces;
    an information interface;
    a plurality of peripheral elements connected to the processor module via the information interface and via the predetermined number of select interfaces, wherein:
        the peripheral elements are selected by the processor module on the basis of select signals output over the select interfaces, and
        instructions are transmitted to the selected peripheral elements over the information interface;
    a first arrangement for assigning selection identifiers to the instructions; and
    a second arrangement for selecting one of the peripheral elements on the basis of one of the select signals and one of the selection identifiers.

2. The method according to claim 1, wherein:

the operating sequence is for an engine control unit in a motor vehicle.

3. The device according to claim 1, wherein:

at least two of the peripheral elements can be connected to one of the select interfaces of the processor module, the at least two of the peripheral elements being different from one another.

4. A processor module for controlling an operating sequence, comprising:

an information interface;

a predetermined number of select interfaces;

an arrangement for outputting select signals over the select interfaces;

an arrangement for outputting instructions over the information interface, wherein:
peripheral elements are selected by the select signals output over the select interfaces, and
respective ones of the instructions are transmitted over the information interface to the selected peripheral elements; and an arrangement for assigning selection identifiers to the instructions, respective ones of the peripheral elements are selected on the basis of the selection identifiers and the select signals.

5. The device according to claim 4, wherein:

the operating sequence is for an engine control unit in a motor vehicle.

6. A method for controlling an operating sequence, comprising the steps of:

causing a processor module including a predetermined number of select interfaces to select a peripheral element in accordance with a select signal output over one of the select interfaces;

transmitting an instruction to the peripheral element over at least one information interface of the processor module;

assigning a selection identifier to the instruction; and transmitting the selection identifier together with the instruction, wherein:
a selection of the select peripheral element is made by the select signal and the selection identifier.

7. The method according to claim 6, wherein:

the operating sequence is for an engine control unit in a motor vehicle.

8. The method according to claim 6, wherein:

the selection identifier and the instruction are transmitted in digital form as an entity including individual binary signals, and the selection identifier replaces a portion of individual signals of the instruction so that, when transmitted as the entity, the selection identifier and the instruction again have the same predetermined number of individual signals.

9. The method according to claim 6, wherein:

the selection identifier and the instruction are transmitted in digital form as an entity including individual binary signals, the instruction includes a predetermined number of individual signals, and the selection identifier supplements the instruction so that a number of individual signals in the selection identifier and the instruction, when transmitted as the entity, is greater than the predetermined number of individual signals.

* * * * *